Patented Apr. 2, 1946

2,397,669

UNITED STATES PATENT OFFICE 2,397,669

PROCESS OF PRODUCING SUBSTITUTED MALONYLCHLORIDES

Morris S. Kharasch, Chicago, Ill., assignor to Eli Lilly and Company, Indianapolis, Ind., a corporation of Indiana No Drawing. Application May 24, 1943, Serial No. 488,233

6 Claims. (Cl. 260—544)

It is the object of my invention to produce substituted malonylchlorides by a simple, effective, and economical reaction.

Such malonylchlorides are represented by the following formula:

(1)

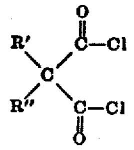

in which R′ is a lower aliphatic hydrocarbon radical (by which I mean one having not more than 6 carbon atoms), and R″ is either a hydrogen atom or a lower aliphatic hydrocarbon radical. When both R′ and R″ are aliphatic hydrocarbon radicals, they may be interconnected in a polymethylene or substituted-polymethylene chain to form a ring structure. When R′ and R″ are thus interconnected to form a ring structure, the compounds are represented by the following formula:

(2)

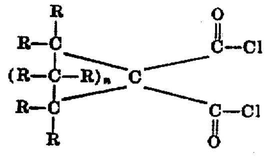

in which R is a member of the class consisting of hydrogen and aliphatic radicals, and $n$ is a whole number between 1 and 4 inclusive, so that the polymethylene or substituted-polymethylene ring has from four to seven members.

This group of malonyl chlorides produced by the present invention may also be defined in other words—as the class consisting of malonyl chlorides having the formula:

(3)

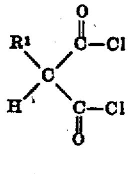

in which $R^1$ represents a lower aliphatic hydrocarbon radical, malonyl chlorides having the formula:

(4)

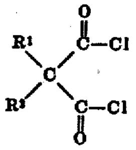

in which each of $R^1$ and $R^2$ represents a lower aliphatic hydrocarbon radical, and malonyl chlorides having the formula:

(5)

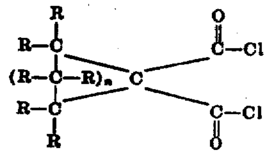

in which R is a member of the class consisting of hydrogen and lower aliphatic hydrocarbon radicals, and $n$ is a whole number between 1 and 4 inclusive.

In the following description and in the claims I use certain terms in referring to hydrogen atoms. The terms are defined as follows:

*a.* By "primary hydrogen atom" I mean a hydrogen atom directly attached to a primary carbon atom.

*b.* By "secondary hydrogen atom" I mean a hydrogen atom directly attached to a secondary carbon atom.

*c.* By "tertiary hydrogen atom" I mean a hydrogen atom directly attached to a tertiary carbon atom.

*d.* By "aprimary hydrogen atom" I mean a hydrogen atom of the class consisting of secondary and tertiary hydrogen atoms.

The claims of the present application are limited to exclude the compounds of Formula 3, and to include in the compounds of Formula 5 only those compounds in which at least one R on any carbon atom is hydrogen.

The method of producing substituted malonylchlorides in accordance with the present invention is to replace a secondary or tertiary hydrogen atom on the α-carbon atom of an acid chloride by a chloroformyl group with the aid of phosgene or diphosgene. The reaction with phosgene is represented by the following equation:

(6)

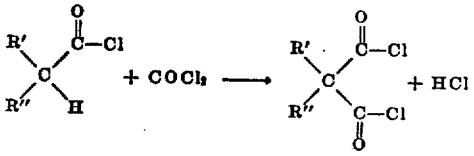

The reaction with diphosgene is represented by the following equation:

(7)

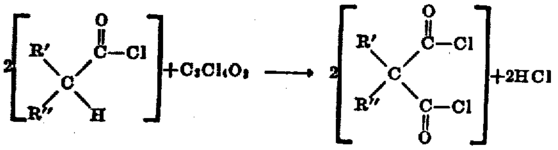

In these equations R′ and R″ have the same meaning as before.

The initial acid chlorides of Equations 6 and 7 may be defined in other words—as the class consisting of acid chlorides having the formula:

(8) 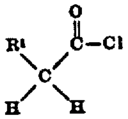

acid chlorides having the formula:

(9) 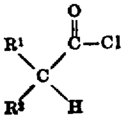

and acid chlorides having the formula:

(10) 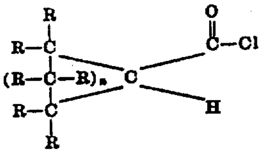

in which formulas $R^1$, $R^2$, R, and *n* have the same meanings as before.

In order that the reaction proceed, it is necessary that a hydrogen atom on the α-carbon atom of the initial acid chloride be aprimary—that is, either secondary or tertiary—for if it is primary there is no reaction. The best yields, however, (about 70–85 percent), are obtained if the hydrogen on the α-carbon atom of the acid chloride is tertiary.

This may be illustrated by the following:

*a*. If acetyl chloride is treated with phosgene or diphosgene, even at high temperature no perceptible reaction occurs; for here the hydrogen atoms on the α-carbon atom of the acid chloride are all primary. This is indicated by the following equation:

(11) 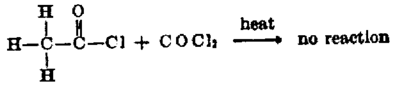

*b*. If propionyl chloride is treated with phosgene or diphosgene, at elevated temperature, a fair yield (20–30 percent) of monomethylmalonylchloride is obtained, for here the two hydrogen atoms on the α-carbon atom are secondary. This is indicated by the following equation:

(12) 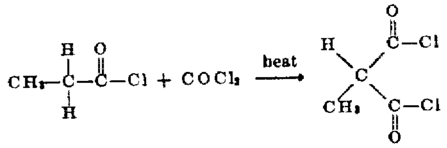

(about 20 percent yield)

*c*. If isobutyryl chloride is treated with phosgene or diphosgene, at elevated temperature, an excellent yield (85–90 percent) of dimethylmalonylchloride is obtained, for here the hydrogen atom on the α-carbon atom is tertiary. This is indicated by the following equation:

(13) 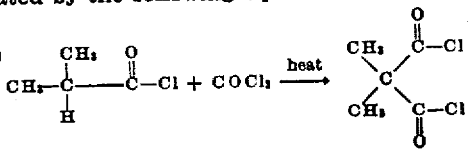

(about 85–90 percent yield)

From this set of Equations 11, 12, and 13 it is apparent

*a*. That a chloroformyl group derived from phosgene or diphosgene replaces very readily a tertiary hydrogen atom on the α-carbon atom of an acid chloride;

*b*. That it replaces with considerable difficulty (taking low yield as a criterion) a secondary hydrogen atom on the α-carbon atom of an acid chloride; and

*c*. That it does not replace at all a primary hydrogen atom on the α-carbon atom of an acid chloride.

My process is therefore of particular advantage in the obtaining of substituted malonylchlorides by the treatment with phosgene or diphosgene of acid chlorides in which the α-carbon is tertiary. Thus:

Phosgene or diphosgene reacts at elevated temperature with isobutyrylchloride to give an 85–90 percent yield of dimethylmalonylchloride; as is shown by Equation 13 above.

Phosgene or diphosgene reacts at elevated temperature with α-ethylbutyrylchloride to give about a 90 percent yield of diethylmalonylchloride.

Phosgene or diphosgene reacts at elevated temperature with α-ethylhexoylchloride to give a high yield of ethylbutylmalonylchloride.

Phosgene or diphosgene reacts at elevated temperature with hexahydrobenzoylchloride to give a 90 percent yield of 1,1-dichloroformylcyclohexane; which may also be called α,α-(1,5-pentamethylene) malonylchloride.

In obtaining the last-named product, it is not necessary to start with hexahydrobenzoylchloride. If desired, the starting compound may be cyclohexane. Under optimum conditions, of 6 hours heating at 225° C. of cyclohexane with diphosgene, the disubstitution product 1,1-dichloroformylcyclohexane is obtained. While unquestionably hexahydrobenzoylchloride must have been produced as an intermediate, yet on careful search no hexahydrobenzoylchloride could be detected in the final product. Thus it is apparent that diphosgene reacts more readily with hexahydrobenzoylchloride than with cyclohexane, and converts quite readily to 1,1-dichloroformylcyclohexane all hexahydrobenzoylchloride that is difficultly produced from cyclohexane.

In all the reactions indicated above, it is desirable that the reaction be carried out at high temperature, of the order of 200–300° C., for several hours; and it is desirable that the reaction be carried out under pressure, conveniently in a bomb if it is done by a batch process.

I claim as my invention:

1. The process of producing disubstituted malonylchlorides, which consists in treating with a reagent of the class consisting of phosgene and diphosgene, under pressure and at high temperature, an acid chloride of the class consisting of acid chlorides having the following formula:

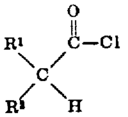

in which each of $R^1$ and $R^2$ represents a lower aliphatic hydrocarbon radical, and acid chlorides having the following formula:

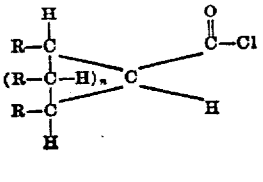

in which R is a member of the class consisting of hydrogen and lower aliphatic hydrocarbon radicals, and $n$ is a whole number between 1 and 4 inclusive.

2. The process of producing 1,1-dichloroformylcyclohexane, which consists in treating hexahydrobenzoylchloride, under pressure and at high temperature, with a reagent of the class consisting of phosgene and diphosgene.

3. The process of producing a disubstituted malonylchloride having the following formula:

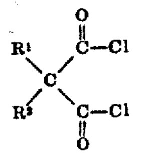

in which $R^1$ and $R^2$ represent a lower aliphatic hydrocarbon radical; which substituents each having not more than 6 carbon atoms; which consists in treating with a reagent of the class consisting of phosgene and diphosgene, under pressure and at high temperature, an acid chloride having the following formula:

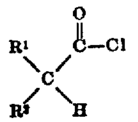

in which $R^1$ and $R^2$ have the same meaning as before.

4. The process of producing dimethylmalonylchloride, which consists in treating isobutyrylchloride, under pressure and at high temperature, with a reagent of the class consisting of phosgene and diphosgene.

5. The process of producing diethylmalonylchloride, which consists in treating α-ethylbutyrylchloride, under pressure and at high temperature, with a reagent of the class consisting of phosgene and diphosgene.

6. The process of producing a malonylchloride of the following formula:

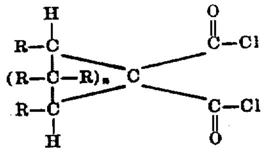

in which R represents a member of the class consisting of hydrogen and lower aliphatic radicals, and $n$ represents a whole number between 1 and 4 inclusive; which consists in treating with a reagent of the class consisting of phosgene and diphosgene, under pressure and at high temperature, an acid chloride having the following formula:

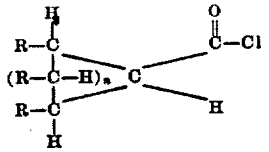

in which R and $n$ have the same meaning as before.

MORRIS S. KHARASCH.

Certificate of Correction

Patent No. 2,397,669. April 2, 1946.

MORRIS S. KHARASCH

It is hereby certified that errors appear in the printed specification of the above numbered patent requiring correction as follows: Page 3, first column, line 19, after "which" insert *each of*; same line, for "represent" read *represents*; line 20, strike out "substituents each" and insert instead *con-*; line 21, strike out "having not more than 6 carbon atoms; which con-; and second column, line 14, claim 6, for that portion of the formula reading "$(R—C—R)_n$" read $(R—C—H)_n$; and that the said Letters Patent should be read with these corrections therein that the same may conform to the record of the case in the Patent Office.

Signed and sealed this 18th day of June, A. D. 1946.

[SEAL]

LESLIE FRAZER,
*First Assistant Commissioner of Patents.* in which R is a member of the class consisting of hydrogen and lower aliphatic hydrocarbon radicals, and $n$ is a whole number between 1 and 4 inclusive.

2. The process of producing 1,1-dichloroformylcyclohexane, which consists in treating hexahydrobenzoylchloride, under pressure and at high temperature, with a reagent of the class consisting of phosgene and diphosgene.

3. The process of producing a disubstituted malonylchloride having the following formula:

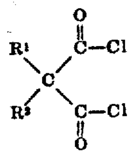

in which $R^1$ and $R^2$ represent a lower aliphatic hydrocarbon radical; which substituents each having not more than 6 carbon atoms; which consists in treating with a reagent of the class consisting of phosgene and diphosgene, under pressure and at high temperature, an acid chloride having the following formula:

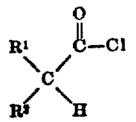

in which $R^1$ and $R^2$ have the same meaning as before.

4. The process of producing dimethylmalonylchloride, which consists in treating isobutyrylchloride, under pressure and at high temperature, with a reagent of the class consisting of phosgene and diphosgene.

5. The process of producing diethylmalonylchloride, which consists in treating $\alpha$-ethylbutyrylchloride, under pressure and at high temperature, with a reagent of the class consisting of phosgene and diphosgene.

6. The process of producing a malonylchloride of the following formula:

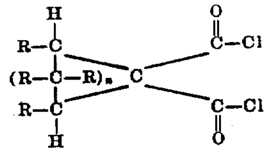

in which R represents a member of the class consisting of hydrogen and lower aliphatic radicals, and $n$ represents a whole number between 1 and 4 inclusive; which consists in treating with a reagent of the class consisting of phosgene and diphosgene, under pressure and at high temperature, an acid chloride having the following formula:

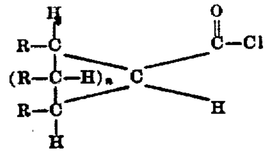

in which R and $n$ have the same meaning as before.

MORRIS S. KHARASCH.

Certificate of Correction

Patent No. 2,397,669. April 2, 1946.

MORRIS S. KHARASCH

It is hereby certified that errors appear in the printed specification of the above numbered patent requiring correction as follows: Page 3, first column, line 19, after "which" insert *each of*; same line, for "represent" read *represents*; line 20, strike out "substituents each" and insert instead *con-*; line 21, strike out "having not more than 6 carbon atoms; which con-; and second column, line 14, claim 6, for that portion of the formula reading "$(R—C—R)_n$" read $(R—C—H)_n$; and that the said Letters Patent should be read with these corrections therein that the same may conform to the record of the case in the Patent Office.

Signed and sealed this 18th day of June, A. D. 1946.

[SEAL]

LESLIE FRAZER,
*First Assistant Commissioner of Patents.*